April 3, 1962  C. K. LEONG  3,028,035
MAGNIFYING DRINKING GLASS
Filed Oct. 17, 1960
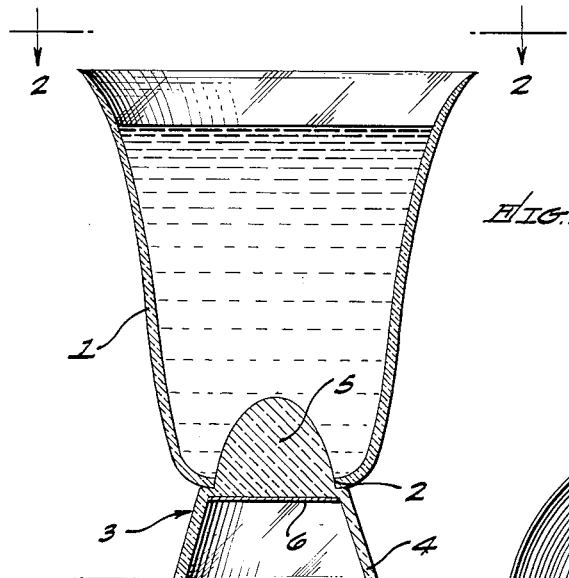
FIG. 1.
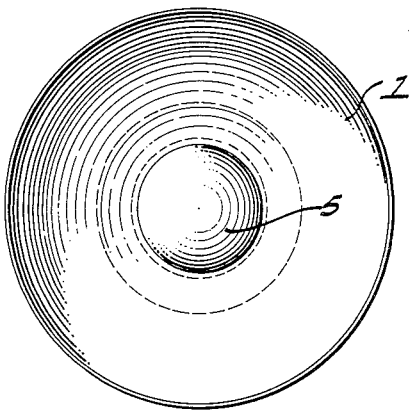
FIG. 2.
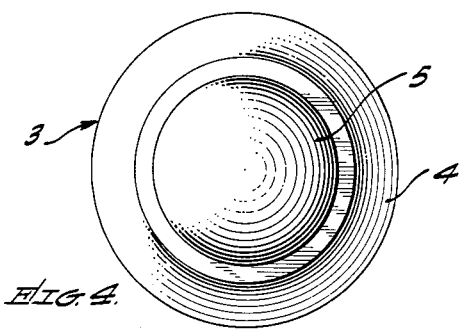
FIG. 4.
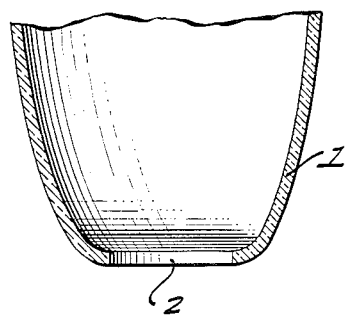
FIG. 5.
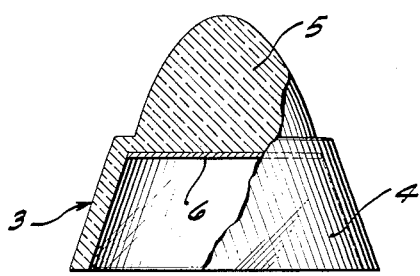
FIG. 3.
INVENTOR.
CRICHTON K. LEONG,
BY
ATTORNEY.

United States Patent Office 3,028,035
Patented Apr. 3, 1962

3,028,035
MAGNIFYING DRINKING GLASS
Crichton K. Leong, 670 N. Spring St., Los Angeles, Calif.
Filed Oct. 17, 1960, Ser. No. 63,175
3 Claims. (Cl. 215—99.5)

This invention relates to a magnifying drinking glass wherein a figure, number, artistic design, or picture, or the like, is made visible in the bottom of a drinking glass when the glass is filled or partially filled with liquid, particularly a transparent liquid.

An object of my invention is to provide a novel magnifying drinking glass in which the picture or design to be made visible in the bottom of the drinking glass is placed or mounted adjacent to a magnifying lens which is mounted in the bottom of the drinking glass.

Another object of my invention is to provide a novel lens construction which is mounted in the bottom of the glass in a novel manner, and is so arranged that the picture or design, or the like, may be easily mounted therein.

Still another object of my invention is to provide a novel magnifying drinking glass in which the magnifying lens is constructed with a parabolic surface, so that when the glass is empty the picture, figure or the like, is distorted or over magnified and is thus not clearly visible. When water or liquor fills the glass, the degree of magnification of the parabolic lens is reduced to a point where the picture or design adjacent thereto is visible.

Other objects, advantages and features of invention may appear from the accompanying drawing, the subjoined detailed description and the appended claims.

In the drawing:

FIGURE 1 is a vertical sectional view of my magnifying drinking glass.

FIGURE 2 is a top plan view as observed from line 2—2 of FIGURE 1.

FIGURE 3 is a side elevation of the magnifying lens with parts broken away to show interior construction.

FIGURE 4 is a top plan view of the lens.

FIGURE 5 is a fragmentary vertical sectional view of the drinking glass with the lens removed.

Referring more particularly to the drawing, the numeral 1 indicates a drinking glass of any well known shape or design. The glass 1 is formed with a circular hole or opening 2 in the bottom thereof, the purpose of which will be further described. A lens assembly 3 is fixedly mounted in the hole 2 as follows: The lens 3 consists of a hollow pedestal 4 which supports the glass 1 and acts as a base for that glass. A lens 5 is formed on the top of the pedestal 4 and is preferably parabolic in shape. The lens 5 is preferably an integral part of the base 4 and extends substantially above that base and through the hole 2 in the bottom of the glass 1, as shown in FIGURE 1. A picture or design 6 is pasted, glued, etched or drawn on the inside of the pedestal 4 and, therefore, on the bottom flat surface of the parabolic lens 5, so that the picture or design is visible from above and when looking through the parabolic lens 5. Normally the amount of magnification of the lens 5 is quite high and will distort the picture or image on the paper, plastic sheet, or the like 6. The magnification is so high that the picture is not clearly visible until the glass 1 is partially or entirely filled with a transparent liquid. The column of water reduces the magnification of the parabolic lens 5 to such a degree that the picture on the part 6 is clearly visible only when the glass is entirely or partly filled with the liquid. When empty the picture is distorted and not clearly visible, as stated above. The picture or image on the paper or plastic 6 should be pressed tightly against the bottom of the parabolic lens 5 and, therefore, it may be glued or otherwise fixedly attached within the pedestal 4, or a cork or similar device may be used to hold the picture in position.

Having described my invention, I claim:

1. A magnifying drinking glass, a pedestal, a lens integrally formed on one side of the pedestal, means fixedly mounting the glass on the pedestal with the lens projecting into the glass, and a picture mounted on one side of the lens and visible through said lens.

2. A magnifying drinking glass, said glass having a hole in the bottom thereof, a hollow pedestal, a lens integrally formed on one side of the pedestal, said lens projecting through the hole in the bottom of the glass, means sealing the glass to the pedestal, and a picture mounted within the hollow of the pedestal and on the bottom face of the lens.

3. A magnifying drinking glass, said glass having a hole in the bottom thereof, a hollow pedestal, a lens integrally formed on one side of the pedestal, said lens projecting through the hole in the bottom of the glass, means sealing the glass to the pedestal and a picture mounted within the hollow of the pedestal and on the bottom face of the lens, said lens being parabolic in shape to excessively distort the picture when viewed therethrough, except when the glass is filled with liquid.

References Cited in the file of this patent

FOREIGN PATENTS

| 14,455 | Great Britain | 1889 |
| 561,700 | Germany | July 11, 1933 |
| 608,350 | Germany | Jan. 21, 1935 |